May 11, 1948. D. H. MONTGOMERY 2,441,533
TOOL
Filed May 20, 1941 5 Sheets-Sheet 1

INVENTOR
DONALD H. MONTGOMERY
BY
ATTORNEYS

Patented May 11, 1948

2,441,533

UNITED STATES PATENT OFFICE 2,441,533

TOOL

Donald H. Montgomery, West Hartford, Conn., assignor to The New Britain Machine Company, New Britain, Conn., a corporation of Connecticut Application May 20, 1941, Serial No. 394,257

20 Claims. (Cl. 77—3)

My invention relates to a tool and more particularly to a forming attachment for inside or outside forming, such as recessing or necking.

It is a general object of the invention to provide an improved forming tool of the character indicated.

It is a more specific object to provide improved actuating means for a tool of the character indicated.

Another object is to provide actuating means for a tool of the character indicated, with means to provide great accuracy of adjustment and operation.

It is another object to provide improved stop rod means for a tool.

Another object is to provide an improved tool of the character indicated for recessing or forming at an angle.

Another object is to provide an improved tool of the character indicated for forming uniform wall thicknesses regardless of diameters.

Another object is to improve various structural and functional features of a tool of the character indicated.

Other objects and various features of novelty and invention will be hereinafter pointed out or will become apparent to those skilled in the art.

Briefly stated, in a preferred form of the invention the improved tool is adapted to be carried by a longitudinal tool slide, say of the Gridley type, for example as shown in Gridley et al. Patent No. 2,055,435. The improved attachment may include a base formed as part of or more conveniently carried by the tool slide. A tool holder member is carried by the base member and is movable relatively thereto. The tool holder member during a part of its movement moves as a unit with the base member and during part of its movement is stopped as by a stop or pull rod, and improved means serve to then feed or move the tool holder member relatively to the base member. The tool may include means for compensating for angularity of the stop rod and if desired the tool may include means for forming, necking, or recessing at an angle. In addition, an improved form of the tool may include means for attaining uniform wall thicknesses regardless of variations in the diameter of the piece. Various novel forms of adjustment have also been provided.

In the drawings which show, for illustrative purposes only, preferred forms of the invention—

My improved tool as illustrated is an attachment for a Gridley type tool slide, though certain of the principles of the invention are susceptible of various other embodiments.

Figure 1:
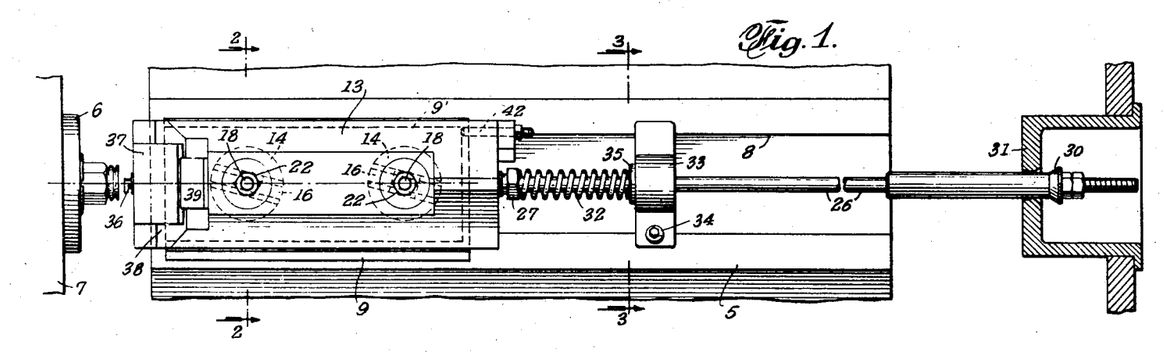
Fig. 1 is a generally radial view, or may be referred to as a top plan view of a part of a Gridley tool slide showing an improved form of attachment associated therewith.

In the drawings, 5 indicates a Gridley type tool slide which, as will be understood, may carry various end working tools for seriatim action upon work pieces in spindles such as 6 carried by an indexible spindle carrier 7. As will be understood, the Gridley tool slide 5 is reciprocated in timed relation with the indexing movements of the spindle carrier.

In the form shown, the tool slide 5 is provided with a dovetail groove 8 extending longitudinally thereof. The improved attachment preferably includes a base member 9 having means for engagement in the dovetail slot 8 for securing the base adjustably to the tool slide. In the form shown, the base has one undercut or dovetail side 10, and at the other side there is a wedging lever 11 actuated by a screw 12 operable from the outside for very securely wedging the entire base down onto the tool slide 5. Such a wedging means for a tool holder or base is more particularly described in Patent No. 2,174,860. The base 9 in the preferred form is made up of two parts 9—9' for a purpose to be described. The tool holder member 13 is slidably mounted on the base 9—9' so as to permit relative movement between the base and tool holder members, as will be described. I provide means between the base and tool holder members for constraining the tool holder member to move on the base in accordance with such means. It is, of course, to be understood that in the particular embodiment illustrated, the base 9—9' and tool holder member 13 ordinarily move as a unit during a part of the longitudinal movement of the tool slide 5, that is, until the tool carried by the tool holder member reaches its point of action, after which the motion of the tool holder member is arrested or limited, and thereafter the tool holder member moves transversely of the base either at right angles or at some other angle thereto.

Figure 2:
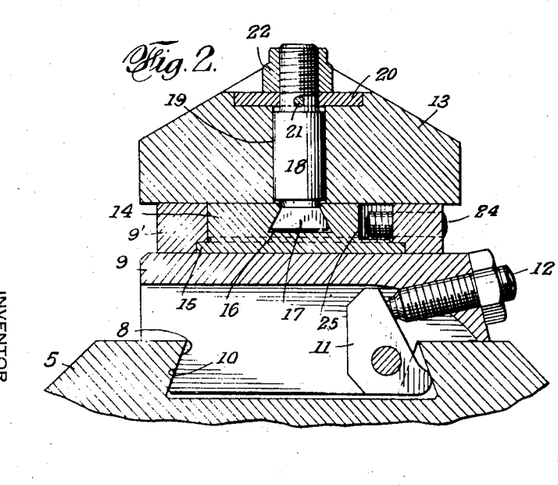
Fig. 2 is an enlarged sectional view, taken substantially in the plane of the line 2—2 of Fig. 1.
Figure 3:
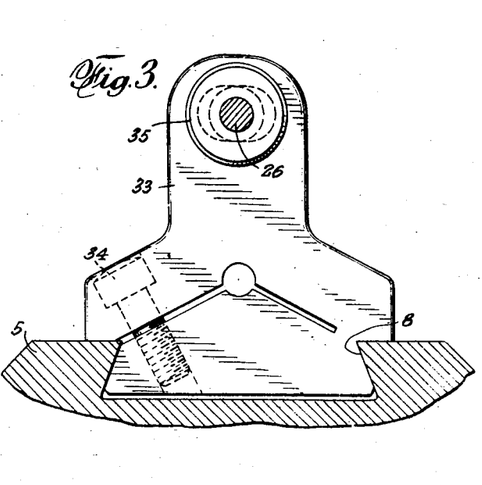
Fig. 3 is a similar view, taken substantially in the plane of the line 3—3 of Fig. 1.

The means for causing the transverse movement of the tool holder member 13 on the base member 9—9' may consist of adjustable means, preferably in the form of a member having a guide slot and carried by one of the relatively movable members and a guide member carried by the other of those relatively movable members. In the form shown, the base 9—9' carries a pair of spaced apart guide members in the form of disks or plugs 14. Such disks may have marginal flanges 15 fitting in an undercut groove between the base parts 9—9' as clearly appears in Figs. 2 and 5. Each plug 14 has guiding means such as a guide dovetail slot 16 in its upper surface, and the tool holder member carries coacting guide means which may be in the form of a dovetail head 17 to slidably fit the dovetail slot 16. The dovetail head 17 is preferably carried by a pin 18, snugly fitting a bore 19, opening through the tool holder member 13. The guide plugs 14—14 are angularly adjustable on the base, and I provide means for visually indicating the position of such angular adjustment. In the form illustrated, there is an indicator disk 20 on each pin 18, and such disks are preferably keyed to the pins as by means of a key pin 21 so that the indicator disk 20 will always be in the same position relatively to the dovetail head 17. A nut 22 may be threaded on the upper end of the pin 18 and serves to adjust the fit of the dovetail head 17 in its guide slot 16, as well as to hold the disk 20 in place and the base 9—9' and tool carrier member 13 in assembled relation. Thus, when the plugs 14 are adjusted angularly, the disks 20 will be turned and divisions 23 on the disks 20 or on the tool holder member 13 or on both, indicate the angular positions to which the plugs 14 have been adjusted. The plugs 14 rotatably but snugly fit between the base portions 9—9' and the tool holder member 13.

The plugs may be angularly adjusted by various means but the improved means which I employ are preferably in the form of spaced adjusting means such as screws 24 threaded in the upper base member 9'. These screws extend into the bore for the plugs 14 and the plugs are preferably slabbed off as indicated at 25 so as to provide abutment surfaces for the adjusting screws 24. It will be clear that the plugs 14 may be very accurately adjusted and securely held in adjusted position by backing off on one adjusting screw and turning up on the other.

It will be seen that the base member 9—9' and the tool holder member 13 may be moved as a unit but where there is relative movement between those members such movement will be along the path defined by the adjusted plugs 14—14. The tool holder member 13 during normal operation moves longitudinally with the tool slide 5 and base 9—9' secured thereto until the cutting tool reaches the point at which transverse movement is desired. At that point the longitudinal movement of the tool holder 13 is arrested or constrained to move at a longitudinal rate different from that of the tool slide, so that continued movement of the tool slide will cause the guiding head 17 to slide in the guideways 16 and thus cause transverse movement of the tool holder member on its base.

In the preferred form the tool holder member 13 is arrested in its longitudinal movement by means of a stop rod, in this case the pull rod 26, which may be secured to the tool holder member 13 by means of micrometer adjustment. Such micrometer adjusting means may comprise a bushing 27 threaded into a bore 28 in the tool holder member 13. The stop rod 26 is threaded into a bore in the bushing 27 and may be held against rotation in the tool holder member 13, as by means of a set screw 29, engaging a flat at the end of the rod 26. It will be clear that if the threads on the rod 26 and on the outside of the bushing 27 are of different lead, a very fine micrometer adjustment of the rod may be obtained by rotating the bushing 27. The opposite end of the rod 26 may carry an abutment 30, adjustably positioned thereon and engageable with a fixed frame abutment 31 when the rod is moved toward the left. Thus a rough adjustment may be obtained by adjusting the rod abutment 30 and a micrometer adjustment may be obtained by adjusting the bushing 27.

In order to cause the tool holder member 13 to move with the tool slide during a part of the longitudinal movement thereof I preferably provide spring means, which may be in the form of a coil spring 32 surrounding the rod 26 and coacting with the bushing 27 and a bracket 33, which may be adjustably held in the dovetail slot 8 of the tool slide 5. One means for holding the bracket in adjusted position may be in the form of a screw 34 for drawing one side of the dovetail on the bracket into engagement with the adjacent side of the dovetail slot, and thus secure a wedging or clamping of the bracket in the position. The rod 26 preferably passes through a bushing 35 on the bracket and the bracket has a transversely enlarged opening to permit the slight transverse movement of the rod occasioned by the transverse movement of the tool holder member 13 on its base. It will be clear, then, that the spring will always urge the tool holder member 13 in a forward direction on its base. As soon as the abutment 30 engages the fixed frame abutment 31 the longitudinal movement of the stop rod 26 and the tool holder member 13 will be arrested and upon continued movement of the tool slide and base member 9—9' the dovetail heads 17 will slide in the angularly adjusted plugs 14—14, and thus cause the tool holder member to move transversely of the base. This transverse movement in the preferred form is utilized as the feed stroke of the tool.

In the form illustrated a recessing tool 36 is carried by a tool block 37, which is in turn held in a transverse way 38 on the tool holder member 13. A securing plate 39 may be held by screws 40 in the tool holder member 13 for securely holding the tool plug 37 in place. Preferably the tool block 37 is adjustable transversely on the tool holder member 13, and adjusting and holding screw means 41 may be employed for adjusting the tool transversely and assisting in holding it securely in adjusted position.

Figure 4:
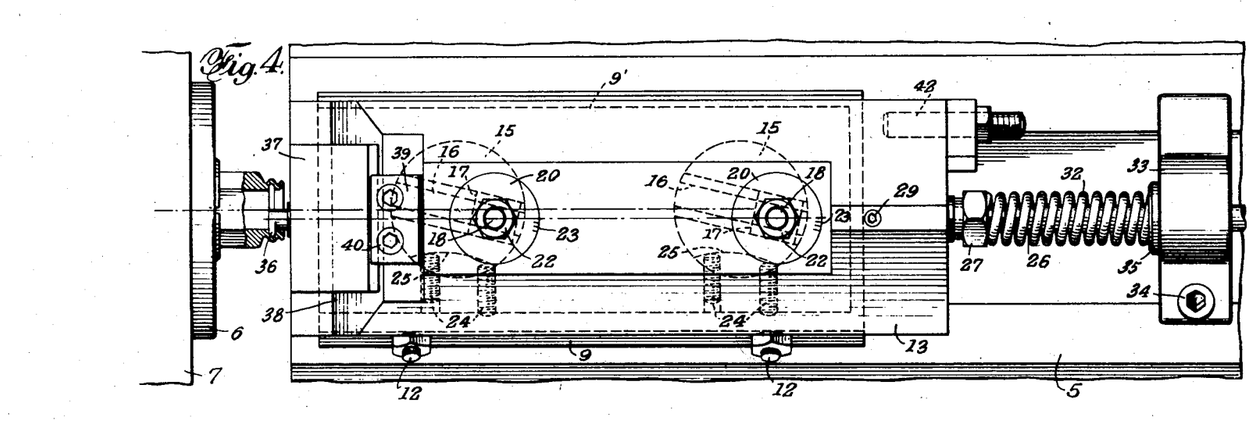
Fig. 4 is an enlarged view similar to Fig. 1 but illustrating further detail.
Figure 5:
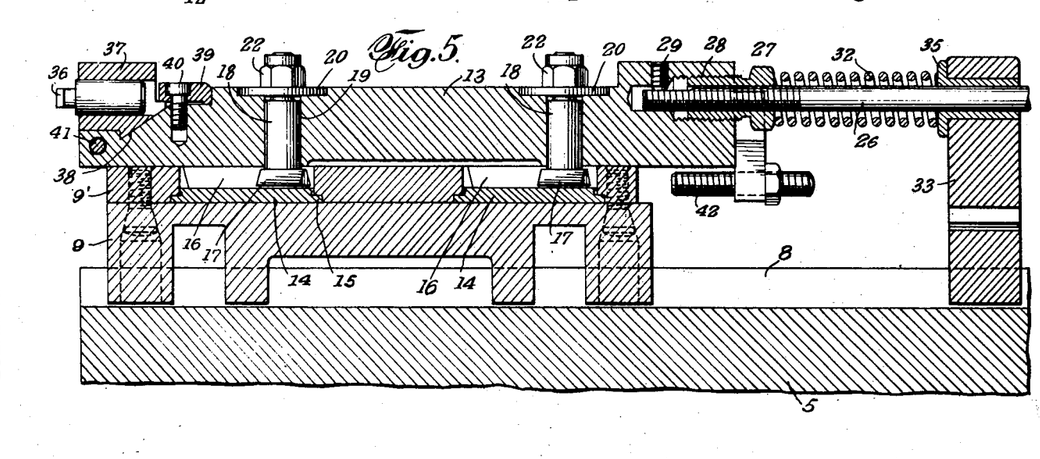
Fig. 5 is a sectional view taken substantially in a radial, or in this case vertical, plane through parts shown in Fig. 4.

The operation of the device as thus far described is as follows:

When the parts are in retracted position, that is, back from the positions shown in Figs. 1, 4 and 5, the spring 32 will have moved the tool holder member 13 forwardly on its base and such movement is limited, as by means of an adjustable stop screw member 42 on the tool holder member 13 and engageable with a part of the base 9—9' or other part in fixed relation therewith. Now forward movement of the tool slide 5 will carry the base 9—9' and tool holder member 13 forward as a unit, since the spring 32 urges the tool holder member forwardly and the forward relative movement, as stated, is limited by the adjustable stop screw 42. When the recessing tool 36 reaches the longitudinal position at which it is desired to move it transversely for its recessing operation, the adjusted abutment 30 on the stop rod will engage its fixed frame abutment 31, and further forward longitudinal movement of the tool holder member 13 will be arrested. Further forward movement of the tool slide, as heretofore explained, will cause the tool holder member 13 to move transversely to feed the recessing tool 36 into the work, as shown in Fig. 4. After the recessing operation the tool slide 5 moves rearwardly but the tool holder member 13 is held in its forward position by means of the spring 32 until the screw 42 is engaged by the rearwardly moving base. At that time the recessing tool will have been withdrawn from the work and thereafter the tool holder 13 moves rearwardly with the tool slide.

An important feature of the present invention may be mentioned at this point. As has been stated Fig. 4 is a radial view, that is, radially of the spindle carrier and tool slide 5. Therefore it will be clear that the tool pressure will be substantially radially inwardly and such tool thrusts acting toward the center of the tool slide 5 are merely compressive strains, which may be radially taken by the various parts of the attachment or tool slide and its guide stem. Heretofore, so far as I am aware, tools of the present character have acted on the work in a radial plane and the tool thrusts were therefore tangent to a circle about the tool slide and passing through the cutting edge of the tool. Such tangential stress imparted a very severe twisting strain to the tool slide and other parts. It may furthermore be noted at this point that all parts of the improved tool or attachment are confined within a sector having its center at the center of the tool slide and, of course, the center of the spindle carrier and passing outwardly so as to bisect the angles between adjacent spindles at the sides of the tool.

With such an arrangement my improved tool will not interfere with any other tools similarly designed and carried by the tool slide 5. Furthermore, all adjustments may be made within such sectors and therefore no other tools carried by the tool slide need interfere with adjustments. Such an arrangement of tools and the advantages thereof have been more fully set forth in my application, Serial No. 383,320, filed March 14, 1941, and now abandoned.

Figure 6:
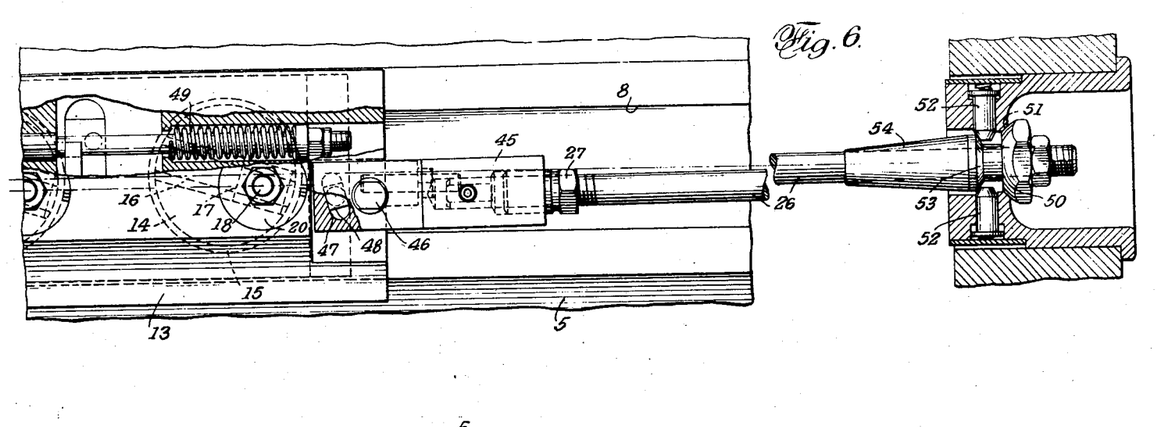
Fig. 6 is a fragmentary view similar to Fig. 1, illustrating a modification and showing means to compensate for angularity of the stop rod.

In the modification shown in Fig. 6, the basic elements may be the same as those heretofore described. However, certain refinements for effecting greater accuracy of transverse movement of the cutting tool are disclosed. It will be appreciated that the stop rod 26 heretofore described must swing about the fixed frame abutment as a center when the tool holder member moves transversely of the tool slide. Such swinging action in effect foreshortens the rod, the extent of such foreshortening depending upon the angle of swing and the length of the rod.

In Fig. 6 I have disclosed means for maintaining the effective length of the rod constant so that the transverse movement of the tool holder member 13 may be substantially exactly at right angles to the tool slide. In the form shown the stop rod 26 is adjustably secured as by means of a micrometer adjustment bushing 27 to a rod head 45. The rod head 45 is longitudinally slidably secured to the tool holder member 13 as by means of a pin 46 secured to the tool holder member 13 and passing through, say, a longitudinally extending slot (not shown) in the rod end 45. Therefore, upon transverse movement of the tool holder member 13 on the slide, the rod end 45 is constrained to move transversely with it. In order to avoid the foreshortening effect of the rod on the tool holder member, I provide a connection between the rod end 45 and the tool holder member 13, permitting the latter to move forwardly to about the same extent as the foreshortening effect of the rod due to its angularity. In the form illustrated, the rod end 45 has an angle slot 47 therein and a sliding head 48 carried by the tool holder member 13 is slidably guided in the slot 47. Thus, when the stop rod 26 is stopped, the connection 47—48 also stops the normal forward movement of the tool holder member 13. As the tool holder member 13 thereafter moves transversely, it will be seen that the angular pin and slot connection 47—48 will permit the rod end 45 to move on the sliding head 48 without imparting any back movement component to the member 13. In other words, the angle of the slot 47 is such that the rod 26 may swing about its fixed abutment without imparting endwise movement to the tool holder member. Therefore, the tool holder member will move at right angles to the tool slide and a truly right angular recess or other cut may be made. In the present instance, instead of employing a spring between a separate bracket and the tool holder member as shown in Figs. 1 to 5, I may employ an internal spring 49, which serves to urge the tool holder member 13 forwardly on the slide.

In Fig. 6 I have also disclosed an improved form of abutment and latching means for the abutment end of the rod 26. In the form illustrated, the abutment head 50 on the rod may be of generally spherical form and the abutting surface 51 on the fixed frame abutment may be formed to interfit with the surface 50. Thus the rod may act as a ball and socket joint in its swinging movement. I preferably also provide latching means for holding the rod in its forward or stopping position. I may employ one or more spring-pressed angle nosed detents 52 which may engage behind a shoulder 53 formed as a part of or on a member secured to the rod 26. Thus, when the rod 26 moves forwardly so as to engage the abutments 50—51 with each other, the latch or latches 52 spring into place and resiliently though sufficiently forcibly hold the rod against rearward movement. If desired, a cam surface 54 may be provided on the rod for facilitating riding up of the detents 52 to a point where they may snap into the space behind the shoulder 53. The abutment means in Fig. 6 when employed will definitely hold the rod in forward position until the tool holder member 13 has moved to its foremost position on its slide base, after which the angle-nosed detents 52 will be forced out from behind the shoulder 53 and the rod will then be free to move with the tool holder member 13 under the influence of the backward movement of the main tool slide 5.

Figure 7:
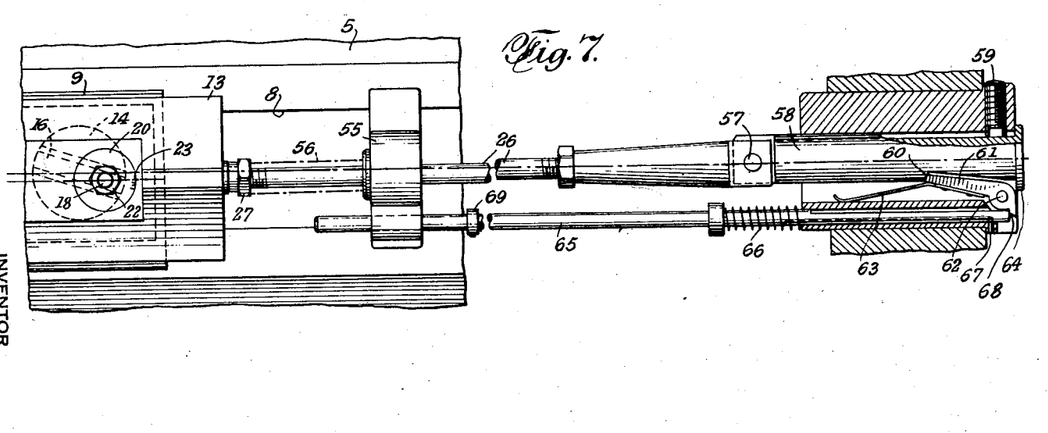
Fig. 7 is a view similar to Fig. 6, illustrating a modification of stop rod latching means.

In the form shown in Fig. 7, the basic elements heretofore described may be employed. In Fig. 7

I have shown an improved form of positive means for latching the stop rod 26 in forward position, and means for unlatching the stop rod at the proper point in the rearward travel of the tool slide 5. In the form shown the stop rod 26 may pass through a bracket 55 fixedly secured on the tool slide 5. If desired, in addition to means for locking the stop rod in its forward position I may employ a spring 66 the same as in connection with the form of Fig. 1. The stop rod 26 may be hinged as by means of a hinge pin 57 to a sliding rear rod end 58. The rod end 58 may be slidably carried in a bore in a frame bushing and if desired may be keyed against rotation therein as by means of a keying screw 59 for assuring the proper angular position of the hinge 57 as well as to properly position the latching means to be described. The rod end 58 is provided with a latching abutment 60 as by milling out a section of the rod end. A latch 61 may be pivoted at 62 to the frame member and the end may be pressed, as by means of a leaf spring 63, in a direction to engage behind the latch abutment 60. The rod end 58 is provided with an abutment 64 engageable with the frame abutment to limit forward movement, as has been heretofore described. Thus, when the tool slide and spring (when employed) carry the rod 26 forwardly, the abutment 64 engages the frame and at that time the latch 61 will spring in behind the abutment 60 and positively latch the rod against backward movement. In order to release the latch, as it must be released before the tool holder member 13 can move rearwardly as a unit with its base and the slide 5, I may employ a latch release rod 65 which may be slidably mounted in the frame and in the bracket 55, as will be understood. The latch release rod 65 may be urged toward the left as by means of a coil spring 66 and limited in its left-hand movement as by means of a pin 67 engaging an a keyway in the rod 65. The forward end of the rod 65 is engageable behind a releasing tail 68 on the latch 61. The latch release rod 65 may carry an adjustably mounted abutment 69, which may be engaged by a movable part of the tool slide, for example the bracket 55 secured thereto. The abutment 69 will be set at such point that when the tool holder member 13 is moved to its desired forward position relatively to its base, the bracket 55 will engage the collar 69 and urge the latch release rod 65 toward the right to swing the latch 60 and thus release the rod 26, after which it may move with the tool holder member 13 as has been heretofore described.

Figure 8:
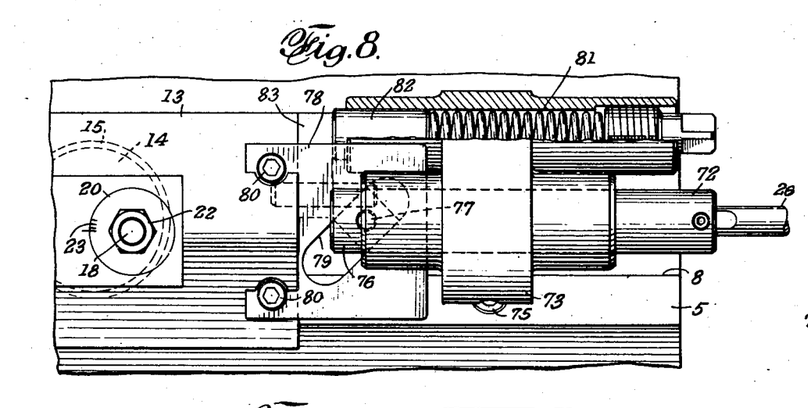
Fig. 8 is a fragmentary view similar to Fig. 1, illustrating the attachment as provided with means for cutting or recessing at an angle.
Figure 9:
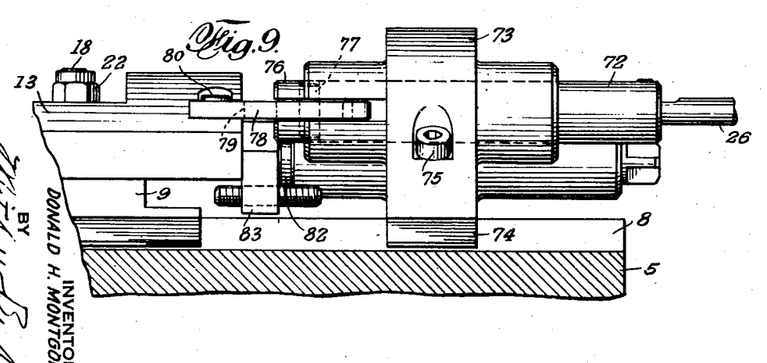
Fig. 9 is a view in front elevation of parts shown in Fig. 8.
Figures 10, 11:
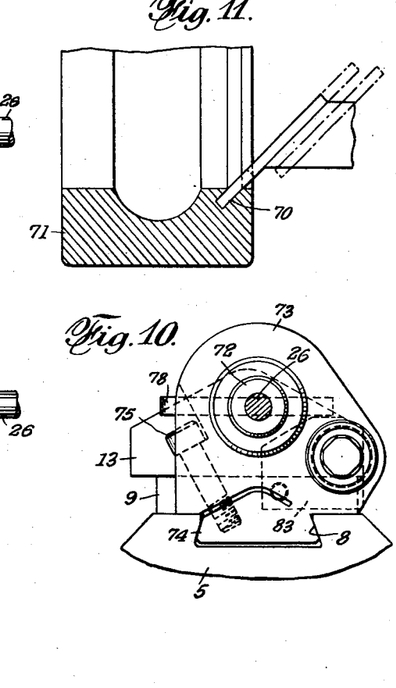
Fig. 10 is a right-hand view in elevation of parts shown in Figs. 8 and 9.
Fig. 11 is a more or less conventional view of a ball bearing ring and illustrates the tool of Fig. 8 recessing at an angle.

In that modification shown in Figs. 8 to 10 I have disclosed means in the form of connection attachment means to facilitate cutting of an angle recess or making of any other angle cut. As has been heretofore described, the normal transverse movement of the tool holder member on its base will provide for a substantially right angle recess or cut, and such recess or cut may be strictly made at right angles by the provision of means such as the angle pin and slot connection 47—48 of Fig. 6. However, in some cases, for example where it is desired to form an angle seal recess such as 70, say, in a bearing ring 71, it is desirable to have the tool holder member 13 move not strictly at right angles to its base, nor along with its base, but at some intermediate angle such as the angle of the tool blade shown in Fig. 11. The appropriate movement of the tool holder member 13 may be accomplished by a combined transverse movement across the base and longitudinally with the base, such two movements being combined in such relationship as to permit of a straight cut at a desired angle.

In the form shown in Figs. 8 to 10, the basic elements heretofore described may again be substantially the same as those heretofore described. In addition, however, I provide means somewhat in the nature of that heretofore disclosed in connection with Fig. 6, but arranged, however, in such a way as to permit a combined longitudinal and transverse movement of the tool holder member 13 so as to cause the cutting tool thereon to cut at a desired angle, for example as shown in Fig. 11. The rod 26 and tool holder member 13 are provided with a connection preferably in the form of an angular pin and slot connection. In the form shown, the stop rod 26 has a head 72, secured in a bracket 73, secured to the tool slide 5 as by means of a dovetail connection 74 and screw 75, as will be understood. The head 72 on the rod 26 may carry a sliding head 76 which may be pivotally secured thereto as by means of a pivot pin 77. The tool holder member 13 may carry a cam plate 78 having an angle slot 79 therein for slidably receiving a head 76 on the rod end 72. The cam plate 78 may be secured to the tool holder member 13 as by means of socket head screws 80—80, whereby cam plates having angle slots of different angles may be substituted so as to produce cuts at varying angles. It will be seen that when the forward movement of the stop rod 26 is arrested, continued forward movement of the tool slide 5 will cause transverse movement of the tool holder member 13 as heretofore described. However, as tool holder member 13 is moved transversely as by means of the adjustable plugs 14 heretofore described, the tool holder member 13 will also move forwardly under the influence, say, of the heavy adjustable spring 81 acting on the abutment head 82 and a bracket 83 carried by the tool holder member 13. This forward movement of the tool holder member 13, under the influence of the spring 81, but controlled and guided by the pin and slot connection 76—79, will cause, along with the normal transverse movement thereof, an angular movement of the tool so as to produce an angle recess such as 70 in Fig. 11. It will be seen that rearward movement of the tool slide will cause the tool holder member 13 to be withdrawn before the combined rearward longitudinal movement of the tool holder member 13 and its base with the tool slide 5. By reversing the direction of the guide means 79, an angle cut in a backward direction, say at right angles to the recess 70, may be made. Such a cut might be useful for cutting a seal groove in the opposite side of the bearing ring shown in Fig. 11.

Figure 12:
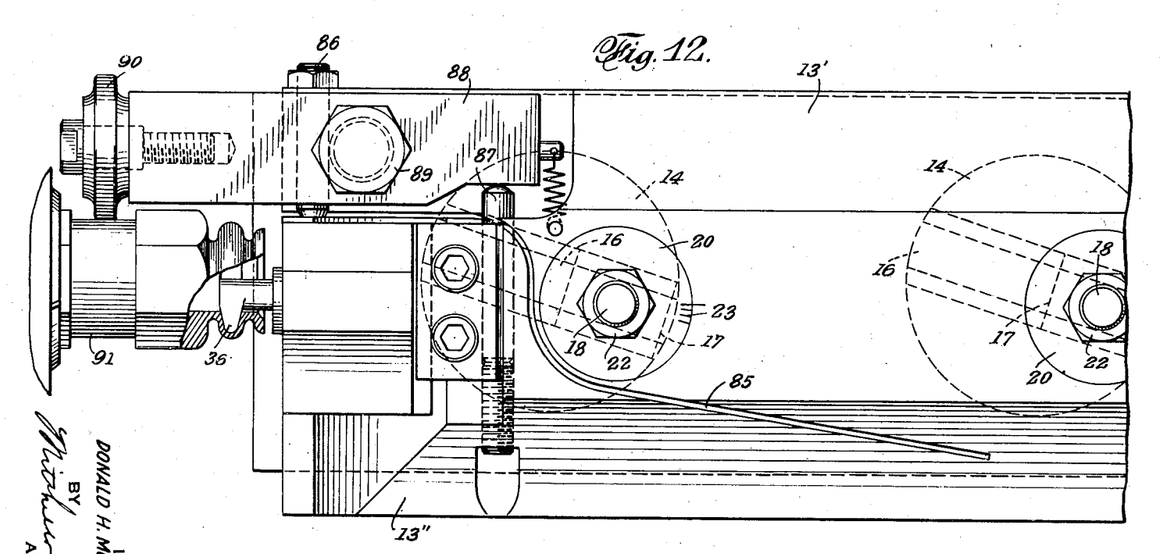
Fig. 12 is an enlarged fragmentary view similar to Fig. 1 showing a tool designed for forming walls of uniform thickness regardless of diameter variations.

In that form of the invention shown in Fig. 12, the tool is designed to cut to a sufficient extent so as to provide a wall of definite thickness regardless of the wall. While this invention is shown as embodied in a tool involving basically the same mechanism as that heretofore described, it is to be understood that the invention as disclosed in Fig. 12 may be embodied in connection with other forms of feeding mechanism.

As illustrated, the so-called tool holder member 13' more or less as heretofore described is separated from the portion 13" carrying the recessing tool 36, which may be the same tool as heretofore described, and which may be secured to its tool holder part 13" in the manner already described. As illustrated, the two parts 13'—13" would together form the tool holder member 13 heretofore described, but, in the present form, the two parts are separated from each other as by means of a saw slot 85 extending part way through the tool holder member, thus permitting a limited resilient movement between the two parts 13'—13". The transverse feeding movement of the tool holder member in Fig. 12 is normally downwardly as viewed on the sheet, and such feeding movement is imparted directly to the part 13' of the tool holder member. For normal feeding movement, I prefer to have the two parts 13'—13" moved together and I may employ an adjustable screw 86 extending through the part 13' and abutting the part 13" so that normal downward feeding movement of the part 13' imparts like movement to the part 13" and consequently to the recessing tool 36. I provide, in addition, feeding means for the tool 36 so that when a piece of larger diameter is being recessed there will be an additional feeding movement so as to reduce the wall thickness to the predetermined desired thickness; for example, when the outside diameter of the piece is large, a deeper recess will be required to provide a definite wall thickness, and when the outside diameter is less, a shallower recess will provide the same wall thickness. Such variations in outside diameter are often occasioned by wear or improper adjustment of tools, etc.

In the form shown I employ a feeler or reference member, which may act directly upon the wall surface or upon a reference surface corresponding to or having a definite relationship to the diameter of the piece at the wall zone. If the final cutting operation is a recessing operation, such reference diameter will be related to the outside diameter of the piece having the wall. On the other hand, if the cutting operation to provide the wall of uniform thickness is an outside or forming operation, the cut will be determined by an inside reference diameter. In the form illustrated, the cutting operation is a recessing operation by the tool 36 and the feeler or reference member engages the outside of the work piece on a diameter having a definite relationship to the outside diameter of the piece to have the definite wall thickness. Such reference diameter may be actual surface of the wall or some other surface removed therefrom.

As illustrated, the tool holder portion 13" carrying the recessing tool 36 may have an adjustable abutment pin 87 thereon and engageable by the tail of a lever 88 which is pivotally mounted on the tool holder member 13' as by means of a fulcrum pin 89. The forward end of the lever 88 may carry a roll 90 or its equivalent, which roll bears upon an outside reference diameter which may be the outside surface of the wall, or, in this case, is a surface 91 bearing a definite relationship to the outside diameter of the wall. Such surface 91 may be broken down and formed at the same time and even by the same tool employed to form the outside of the wall. Now, when the outside of the wall adjacent the recessing tool is of a diameter larger than normal, the diameter of the surface 91 will be correspondingly larger and the roll 90 will engage the surface 90 sooner than it would were the surface 91 or less diameter. When the tool holder part 13' feeds downwardly with the roll 90 in engagement with the reference surface 91, the lever 88 will rock about its pivot 89 and the tail of the lever acting through the adjustable abutment pin 87 will feed the recessing tool an additional distance and the tool holder part 13" will, of course, move ahead of and away from the stop screw 86 which normally feeds it. Thus, the recessing tool 36 will be fed by an additional amount, depending upon the diameter of the surface 91. By the means described, it will be apparent that a wall of uniform thickness may be provided, regardless of the diameter of the wall.

While the invention has been described in considerable detail and various forms and modifications illustrated, it is to be understood that numerous changes, embodiments, and combinations may be made within the scope of the invention as defined in the appended claims.

I claim:

1. In a device of the character indicated, a base member, a tool holder member carried thereby and movable relatively thereto, and angularly adjustable slide means connecting said two members for guiding said members relatively to each other whereby upon longitudinal motion of said members relatively to each other one of said members will be moved transversely of the other, means for moving said base and tool holder unitarily in a longitudinal direction, and means for limiting the longitudinal movement of said tool holder member while said base member continues to move longitudinally, for the purpose set forth.

2. In a device of the character indicated, a base member, a tool holder member, a disk carried by one of said members, a guide member carried by the other of said members, said guide member and disk having coacting guiding surfaces, means for angularly adjusting said disk on its member, means for moving said members unitarily in one direction, and means for limiting motion of said tool holder member in said direction while movement of said base member in said direction continues, whereby the ensuing relative movement of said base and tool holder members will cause said guiding surfaces to move said base and tool holder members relatively to each other in another direction.

3. In a device of the character indicated, a base member, a tool holder member movable relatively thereto, a guide disk having a guide slot therein carried by said base member, means for securing said guide disk with said guide slot in angularly adjusted positions, means having a slide engageable with said slot and carried by said tool holder member, means for moving said two members as a unit, and means for arresting such movement of said tool holder member, during continued movement of said base member, whereby said tool holder member will be thereafter moved by slot and slide engageable therewith.

4. In a device of the character indicated, a base member to be secured to a tool slide, a tool holder member carried by said base member and movable relatively thereto, adjustable guiding means for controlling the relative movement between said base member and tool holder member, means for limiting the movement of said tool holder member while said base member is moved by said tool slide, and means for causing said base member and tool holder member to move as a unit during a part of the movement of said base member by said tool slide.

5. In a device of the character indicated, a base member to be secured to a tool slide, a tool holder member carried by said base member and movable relatively thereto, angularly adjustable guide means carried by said base member and tool holder member for controlling the relative movement between said members, stop means for arresting the movement of said tool holder member at a predetermined point whereby continued movement of said base member will cause said guide means to feed said tool holder transversely of said base member.

6. In a device of the character indicated, a base member, a tool holder member movable relatively thereto, adjustable guide means for controlling the relative movement between said members, means for moving said base member in a longitudinal direction, spring means for urging said tool holder member to move unitarily with said base member, and stop means for arresting the movement of said tool holder member at a predetermined point whereby continued movement of said base member will cause a transverse feeding movement of said tool holder.

7. In a device of the character indicated, a tool slide, a base member fixedly carried on said tool slide, a tool holder member carried by said base member and movable relatively thereto, adjustable guiding means between said two members for controlling the relative movement between said members, a bracket fixedly carried by said tool slide, spring means between said bracket and tool holder member for urging said tool holder member in one direction, and a stop rod for limiting movement of said tool holder member in said direction, for the purpose described.

8. In a device of the character indicated, a base member, a tool holder member movable relatively thereto, guide means between said members for controlling the relative movement between said members, resilient means for urging said tool holder member in one direction relatively to said base member whereby said tool holder member and base member may be moved as a unit in said direction, and means for positively causing said members to move together as a unit in a direction opposite to said first mentioned direction.

9. In a device of the character indicated, a base member, a tool holder member movable relatively thereto, means for guiding said tool holder member on said base member for angular movement thereon whereby such movement has a longitudinal and a transverse component, a stop rod connected to said tool holder member for arresting longitudinal movement thereof, means for constraining one end of said stop rod to move in a transverse direction with said tool holder member, and compensating means connecting said end of said stop rod and said tool holder member to compensate for the angularity of said stop rod when one end is moved transversely with said tool holder.

10. In a device of the character indicated, a tool holder member movable in longitudinal and transverse directions, a stop rod having a fixed abutment at one end, a connection between said tool holder member and the opposite end of said stop rod for constraining said last mentioned end to move transversely with said tool holder member, and connecting means between said last mentioned end of said stop rod and said tool holder member to permit slight longitudinal movement of said tool holder member relatively to said last mentioned end of said stop rod whereby angularity of said stop rod may be compensated for and said tool holder member may have a substantially straight transverse movement.

11. In a device of the character indicated, a tool holder member having a longitudinal and transverse movement, a stop rod for controlling the longitudinal movement of said tool holder, fixed abutment means for one end of said stop rod, connecting means between said tool holder and the opposite end of said stop rod for constraining said last mentioned end of said stop rod to move with said tool holder, and angularly arranged pin and slot connecting means between said last mentioned end of said stop rod and said tool holder whereby said tool holder may be moved longitudinally relatively to said last mentioned end of said stop rod to compensate for angularity of said stop rod and permit said tool holder to move transversely in a substantially straight line.

12. In a device of the character indicated, a base member, a tool holder member, said members being movable relatively to each other, means for moving said members in a longitudinal direction as a unit, stop rod means for limiting longitudinal movement of said tool holder member in one direction, said stop rod means including a fixed frame abutment member, a coacting abutment member on said stop rod, and means for latching said abutments in engagement with each other.

13. In a device of the character indicated, a base member, a tool holder member movable relatively thereto, a stop rod for limiting longitudinal movement of said tool holder member, said stop rod means including a fixed frame abutment, a coacting abutment on said stop rod, and means for resiliently latching said abutments in engagement with each other, for the purpose described.

14. In a device of the character indicated, a base member, a tool holder member movable relatively thereto, stop rod means for limiting longitudinal movement of said tool holder member, said stop rod means including a fixed frame abutment, coacting abutment means on said stop rod, means for latching said coacting abutments in relationship to each other, and means actuated by a part of said base member for unlatching said stop rod.

15. In a device of the character indicated, a base member, a tool holder member movable relatively thereto, stop rod means for limiting longitudinal movement of said tool holder member, said stop rod means including a fixed frame abutment, coacting abutment means on said stop rod, means for latching said coacting abutments in relationship to each other, and means for unlatching said stop rod.

16. In a device of the character indicated, a base member, a tool holder member movable relatively thereto, stop rod means for limiting longitudinal movement of said tool holder member in one direction, said stop rod means including a fixed frame abutment, an abutment on said stop rod for coaction with said frame abutment, means for latching said abutments in engagement with each other, and means actuated by one of said first mentioned members for positively unlatching said stop rod.

17. In a device of the character indicated, a base member, a tool holder member movable relatively thereto, means for moving said two members longitudinally as a unit, means for causing generally transverse movement of said tool holder member on said base member, and stop means for controlling longitudinal movement of said tool holder member, said stop means including angularly positioned guide means between said tool holder member and said stop means to permit limited longitudinal movement of said tool holder member during transverse movement thereof whereby a tool carried by said tool holder member may be cut on an angle.

18. In a device of the character indicated, a base member, a tool holder member movable relatively thereto, means for moving said base member longitudinally, means for causing a transverse movement of said tool holder member upon longitudinal movement of said base member, and stop means for constraining said tool holder member to move angularly during its transverse movement by said base member.

19. In a device of the character indicated, a base member, a tool holder member carried thereby and movable relatively thereto, means for moving said base member longitudinally, coacting means between said base member and tool holder member for moving said tool holder member in a direction generally transversely of the direction of movement of said base member, a stop member, and coacting means between said stop member and said tool holder member for constraining said tool holder member to move angularly during its transverse movement by said base member.

20. In a device of the character indicated, for forming a wall of definite thickness on a rotating piece to be turned, a tool holder to carry a tool, means for feeding said tool, and means coacting with a part of said rotating piece for adjusting the feed of said tool in accordance with the diameter of said part of said rotating piece.

DONALD H. MONTGOMERY.

REFERENCES CITED

The following references are of record in the file of this patent:

UNITED STATES PATENTS

| Number | Name | Date |
|---|---|---|
| 47,954 | Jillson | May 30, 1865 |
| 463,750 | Stehman | Nov. 24, 1891 |
| 513,827 | Richards | Jan. 30, 1894 |
| 649,907 | Brophy | May 22, 1900 |
| 695,980 | Wilhelm | Mar. 25, 1902 |
| 892,387 | De Leeuw | June 30, 1908 |
| 1,546,062 | Edmunds | July 14, 1925 |
| 2,085,685 | Mussler | June 29, 1937 |